(No Model.) 3 Sheets—Sheet 1.
J. F. PARKER.
CASH INDICATOR AND REGISTER.

No. 580,798. Patented Apr. 13, 1897.

WITNESSES:
M. S. Bloudel
Amos W. Hart

INVENTOR
John F. Parker
BY Munn & Co.
ATTORNEYS.

(No Model.) 3 Sheets—Sheet 2.
J. F. PARKER.
CASH INDICATOR AND REGISTER.

No. 580,798. Patented Apr. 13, 1897.

WITNESSES:
M. D. Blondel
Amos W. Hart

INVENTOR
John F. Parker.
BY Munn & Co.
ATTORNEYS.

(No Model.) 3 Sheets—Sheet 3.
J. F. PARKER.
CASH INDICATOR AND REGISTER.
No. 580,798. Patented Apr. 13, 1897.
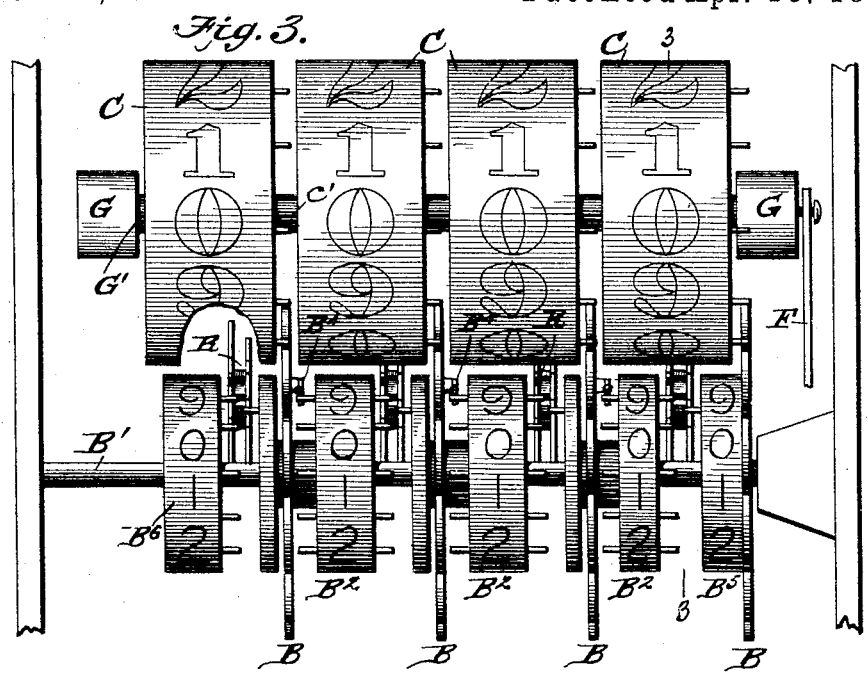
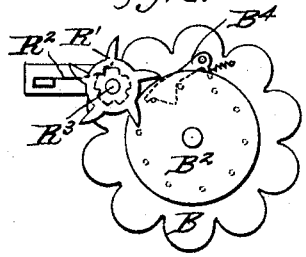
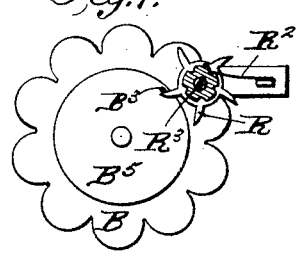
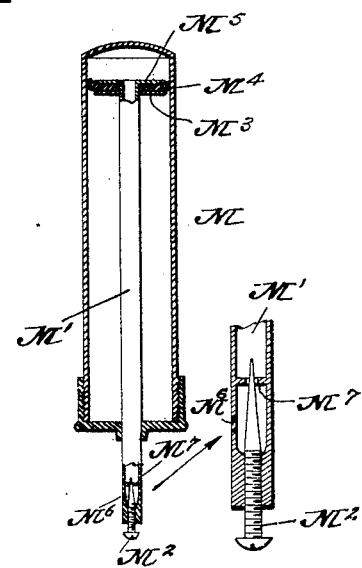
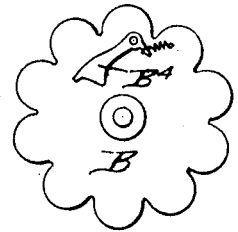
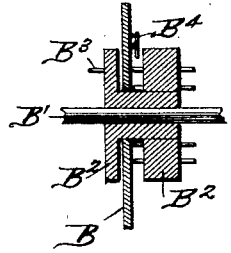
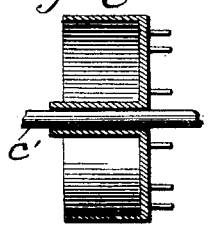
WITNESSES:
M. D. Bloudel
Amos W. Hart
INVENTOR
John F. Parker.
BY Munn & Co.
ATTORNEYS.

UNITED STATES PATENT OFFICE.

JOHN F. PARKER, OF McPHERSON, KANSAS.

CASH INDICATOR AND REGISTER.

SPECIFICATION forming part of Letters Patent No. 580,798, dated April 13, 1897.

Application filed September 23, 1896. Serial No. 606,762. (No model.)

*To all whom it may concern:*

Be it known that I, JOHN F. PARKER, of McPherson, in the county of McPherson and State of Kansas, have invented a new and Improved Cash Indicator and Register, of which the following is a specification.

It is the object of my invention to provide a comparatively simple machine for registering all individual sales and cash receipts from one cent upward and also for indicating the total amount of sales and receipts.

Figure 1:
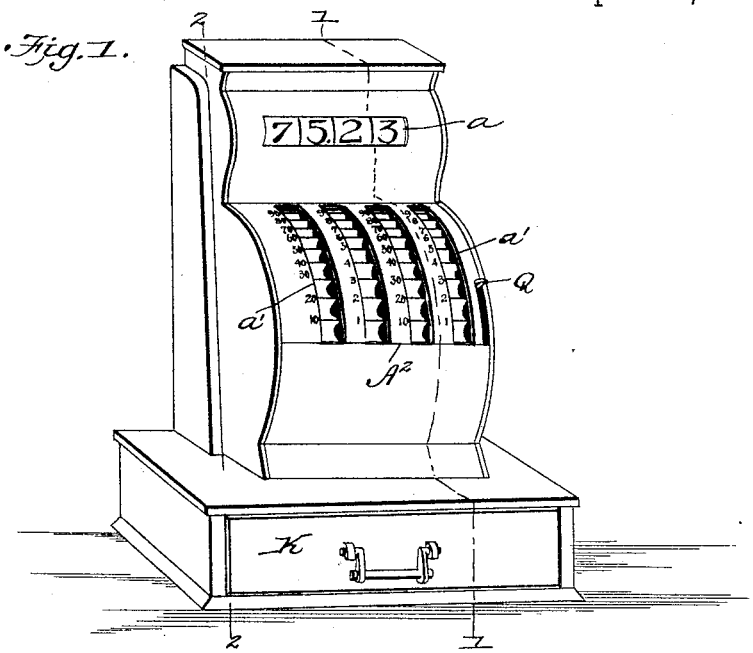
Figure 10:
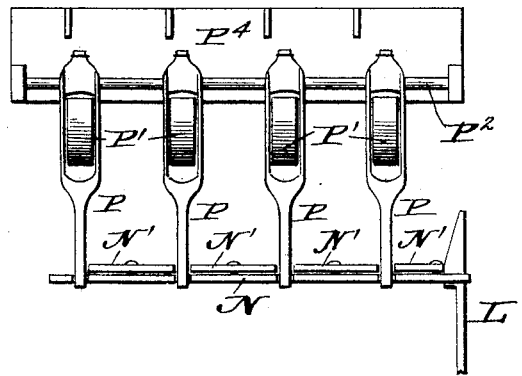
Figure 8:
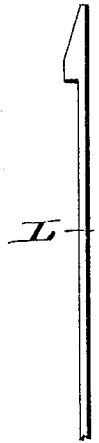
Figure 9:
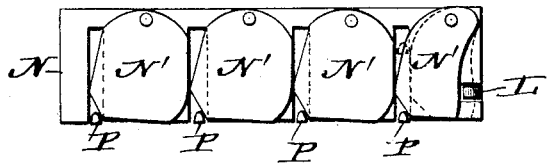
Figure 2:
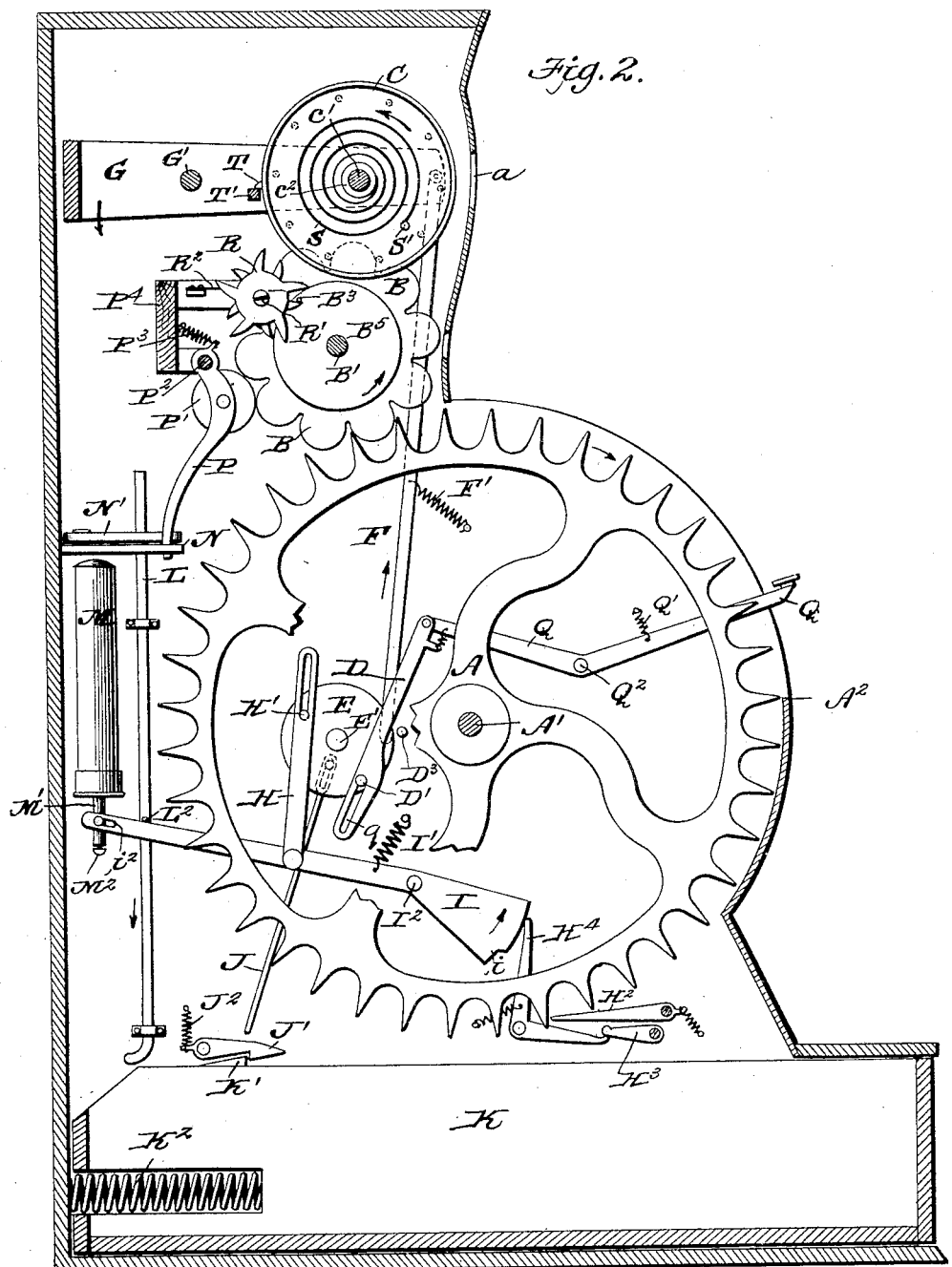

In the accompanying drawings, (three sheets,) Figure 1 is a perspective view of the apparatus. Fig. 2 is an enlarged vertical section on line 1 1 of Fig. 1. Fig. 3, Sheet 2, is a front view of the indicating and adding wheels and adjunctive devices. Fig. 4 is a central section of the adding-wheels. Fig. 5 is a side view of one of the cog or adding wheels that operate the indicating-wheels. Fig. 6 is a vertical section showing a cog or adding wheel and a toothed carrying-wheel that engages and rotates it intermittently or step by step. Fig. 7 is a vertical section of the cog and adding wheel of the units-column. Fig. 8 is a side view of the top portion of a rod that locks mechanism for locking adding and indicating wheels. Fig. 9 is a horizontal section or in effect a top plan view of part of such locking mechanism. Fig. 10 is a front view of said locking mechanism. Fig. 11 is a central section of one of the indicating-wheels. Fig. 12 is a sectional view of the air-check.

As shown in Figs. 1 and 2, the broad flat base of the register contains a sliding drawer K, that is automatically pushed out by a spring $K^2$ when released by a locking-catch J' K'. The casing, composing the upright portion or body of the register, contains in its upper portion a series of indicating-wheels C, having their peripheries inscribed with figures "1" to "0," which may be seen through a horizontal slot $a$ in the face or front of the casing. The said wheels C are mounted loose on a transverse rod $c'$, which is fixed in the parallel arms of a rocking frame G, pivoted at G'. Each wheel C has ten lateral pins or teeth.

Below and slightly in rear of the wheels C, Figs. 2 and 3, is arranged a series of wheels B, having toothed or scalloped edges. For convenience they will be hereinafter termed "cog-wheels," since they are practically such. They have ten teeth, corresponding to those of wheels C.

In the body or enlarged lower portion of the register-casing are arranged the large counting-wheels A, which are mounted rotatably on a central transverse shaft A' and whose toothed peripheries are visible through vertical slots $a'$ in the casing. The digits "1" to "9" are inscribed on the casing-front alongside the slots $a'$, as shown. The teeth of said wheels A engage the cog-wheels B, which in turn engage the lateral pins of the indicating-wheels C and thus rotate the latter.

The wheels A are rotated by placing a finger in one of the peripheral notches and pushing down until such finger comes in contact with the edge $A^2$ of the casing. If the finger be placed in a notch of the right-hand or units wheel, which notch is opposite the figure "3," the said wheel will rotate the indicating-wheel C, which it engages, three-tenths of a revolution, and hence the figure "3" will appear in the units place in the upper slot $a$. Each cog-wheel B is so arranged as to lap on the side of an indicating-wheel C and normally engages the pins projecting laterally from the same. Such engagement can obviously be destroyed by rocking the frame G and thus raising the wheels C, which is effected by mechanism hereinafter described.

As shown in Fig. 3, there is a series of adding-wheels $B^2$, $B^5$, and $B^6$, peripherally inscribed with figures from "1" to "0" and arranged between the cog-wheels B on the same shaft B'. The wheels $B^2$ and $B^6$ are loose on the shaft, but $B^5$ is attached to the side of the right-hand or unit wheel B and hence rotates with it. Between but above the adding-wheels $B^5$ $B^2$ $B^6$ and on a separate shaft $R^3$ are arranged five-pointed carrying-wheels R.

Each adding-wheel has a single pin on one side for engaging a counting-wheel R once in each rotation, and all the adding-wheels save the units-wheel have ten pins on the side opposite that on which such single pin is placed. There are also ten pins on the inner part of the adding-wheels of the tens, hundreds, and tens-of-hundreds column, as shown is Fig. 4. It is apparent if the wheel B be rotated completely its single pin B³ will strike a tooth of wheel R and rotate it one space or one-fifth of a revolution, and thereby the wheel R will rotate also the adjacent adding-wheel B² one space, thus registering the ten carried. It is thus seen that the cog-wheel B, except when rotated by the corresponding wheel A, remains stationary. When the adding-wheel corresponding to it is rotated, the ten pins on the inner side of the adding-wheel, acting in conjunction with the pawl B⁴, allow the adding-wheel to rotate one notch without moving the cog-wheel, yet the adding-wheels are always ready to move with the cog-wheel which works between their parts.

A spring R², Fig. 7, holds the carrying-wheels R from accidental rotation.

In Fig. 2 I illustrate the mechanism for locking the wheels A B C. It consists of the following parts: An obtuse-angle lever Q is pivoted at Q² within the casing and its free end projects through a slot in the latter, as shown in Fig. 1. A link or connecting-bar D is pivoted to the inner end of said lever Q and its lower end is provided with a lengthwise slot $q$, having a lateral offset at its upper end. The side of the bar D has a swell or enlargement opposite said offset for a purpose presently stated. A rotary disk E is mounted on a journal E' and provided with a pin D', that projects into the aforesaid slot $q$. A vertical rod or bar F is pivoted at its respective ends to the disk E and a rocking frame G, (see Fig. 3,) in which the shaft $c'$, carrying wheels C, is journaled. Said frame G is pivoted on a transverse shaft G'. It is now apparent that when the free end of lever Q is depressed the disk E will be rotated a part of a revolution, owing to engagement of the offset of slot $q$ with the pin D'. It is further apparent that by this operation the frame G will be rocked and its front end raised and the indicating-wheels C thereby taken out of engagement with the cog-wheels B, so that wheels C may be automatically rotated back to "0" by the volute springs S, one of which is attached to the hub $c^2$ and S' of each wheel, as shown in Fig. 2.

When the frame G is raised, as stated, the slotted end of link D is automatically thrown or pushed laterally by engagement of its swelled portion with a fixed pin D³, and thus the disk-frame G is free to drop to its normal position.

Another operation and result simultaneously effected by depressing the lever Q is the following: A lever I, Fig. 2, having its inner end weighted and provided with a notch $i$, is pivoted on a pin I² and has a slot-and-pin connection at $i^2$ with the rod M' of a piston (see Fig. 12) that slides in an air-cylinder M. The said piston has an aperture that allows slow passage of air, and the screw M² in the end of the stem or rod M' regulates the exhaust or escape of air, so that the movement of the lever I may be regulated at will. In practice the regulation is such as to require about fifteen seconds for the lever to return to its normal or uppermost position. The piston or valve, Fig. 12, sliding in cylinder M is composed of a leather disk M⁴, secured between two smaller metal disks M³ M⁵. The upward movement of the piston is twisted or checked by the compression of the air above it. The tapered screw M² regulates escape of air through a diaphragm M⁷ and the lateral orifice M⁶. A link H connects said lever I with the disk E through the medium of a pin H', that works free in a slot of the lever.

A vertical locking and trip rod L, Figs. 2 and 8, is slidable in brackets and provided with a pin L², that rests on the lever I, whereby the rod L is supported. The upper end of the rod is beveled and works in a slot or opening in a shelf or bracket N and in frictional contact with one of a series of pivoted locking-disks N', that are arranged flatwise, side by side, on said shelf N. These disks N' lock the levers P, which in turn lock the cog-wheels B, the said levers being pivoted vertically at P² and provided with rollers P', that work in direct contact with the wheels B and thus serve as rolling pawls. The free lower ends of the levers P work in transverse slots of the shelf N, as shown in Fig. 9, and are held in normal locking position, Figs. 2 and 9, by springs P³, attached to frame P⁴.

The disk E is connected by a rod J with a pivoted catch J', that engages a shoulder K' on the drawer K. A spring J² aids gravity in holding the said catch securely engaged with such shoulder K'.

A résumé of the operation of the register so far as described is as follows: It may be supposed a sale has been made and that a number indicating the amount received appears through the slot $a$ in the casing. Then when the lever Q is depressed for the purpose of registering the new or present sale the following operations and results occur practically simultaneously: The disk E rotates about one-fourth of a revolution. The rod F rocks the frame G and thus raises the indicating-wheels C out of engagement with the cog-wheels B, so that the springs S may rotate wheels C back to their initial position, which is determined by engagement of their peripheral projections T, Fig. 2, with a stop-bar T', extending the length of frame G. This movement of wheels C obviously destroys the indication of the amount previously taken in. The rotation of disk E also depresses the inner end of the lever I through the medium of bar H and pin H' and causes engagement of the locking spring-pressed angle-pawl H⁴ with the notch $i$ in the weighted end of the lever. It also raises catch J' and releases the cash-drawer K, whose spring K² forces it out, and thereby leaves the trip-rod L free to slide downward, which releases disks N', that in turn release levers P, and thus allows freedom of rotation to the cog-wheels B and connecting-wheels A. The cash received may then be registered by operating one or more of the wheels A, as will be understood from previous description. It will be seen the angle-catch H⁴, Fig. 2, is tripped and releases lever I by means of the pawl H², with which the teeth of one of the counting-wheels A work in contact. The pawl acts on a pivoted trip-bar H³, which extends the entire width of the casing, parallel to the front of the latter. Thus the first movement of any one of the counting-wheels A releases lever I and allows its spring I' to return it to its normal position. Thus, in brief, by pressing down the lever Q the registration of the previous sale is canceled, the working mechanism released, and the cash-drawer opened automatically by the spring K. After the desired new registration has been effected the drawer K is to be closed manually, which will force trip-rod L up to its normal position and thus again lock the entire working mechanism; but a careless or dishonest clerk may leave the cash-drawer open, and to guard against this result, and thus prevent use of the previous registration or a part of it to apply or add to the present or new sale, I employ automatic mechanism which locks the working parts within fifteen seconds—that is to say, the valve-rod M' moves upward and thus raises the slotted end of lever I, which forces trip-rod L up to its locking position. The time within which this is done may be varied, of course, by adjusting the screw M², but fifteen seconds is ample to allow the operator to register a cash-receipt.

What I claim is—

1. In a cash-register, the combination of the notched, manually-operated counting-wheels, the cog-wheels engaging them, the indicating-wheels engaging said cog-wheels, a rocking support or frame in which the indicating-wheels are mounted, means for rotating the indicating-wheels backward to zero, when released from engagement with the cog-wheels, and the mechanism for rocking the aforesaid frame, composed of a pivoted, depressible finger-lever, and devices connecting its inner end with the frame, substantially as shown and described.

2. In a cash-register, the combination of the notched, manually-operated counting-wheels, the cog-wheels engaging them, the indicating-wheels engaging said cog-wheels, a rocking support or frame in which the indicating-wheels are mounted, means for rotating the indicating-wheels backward to zero, when released from engagement with the cog-wheels, the pivoted, depressible finger-lever, a link or bar pivoted to its free end, and a rotatable disk having a pin engaging such link, substantially as shown and described.

3. In a cash-register, the combination with the notched, manually-operated counting-wheels, cog-wheels engaging the latter, and adding-wheels arranged alongside the cog-wheels, carrying-wheels engaging the adding-wheels, pivoted lever-pawls which engage the cog-wheels, pivoted disks which lock the free ends of such pawls, and means for automatically locking and releasing said disks, substantially as shown and described.

4. In a cash-register, the combination with the notched, manually-operated counting-wheels, cog-wheels engaging the latter, and adding-wheels arranged alongside the cog-wheels, carrying-wheels engaging the adding-wheels, pivoted lever-pawls which engage the cog-wheels, pivoted disks which lock the free ends of such pawls, a vertically-slidable trip-bar whose upper end is beveled to adapt it to move the disks for locking the pawls, and means for raising said bar to the locking position, substantially as shown and described.

5. In a cash-register, the combination with the notched, manually-operated counting-wheels, cog-wheels engaging the latter, and adding-wheels arranged alongside the cog-wheels, carrying-wheels engaging the adding-wheels, pivoted lever-pawls which engage the cog-wheels, pivoted disks which lock the free ends of such pawls, a vertically-slidable trip-bar whose upper end is beveled to adapt it to move the disks for locking the pawls, a pivoted, horizontal lever which engages said trip-bar, the rotatable disk, a slotted link which connects such lever and disk, a pivoted depressible finger-lever, and a link or bar pivoted to the inner end of the finger-lever, and having in its lower end a lengthwise slot with offset or lateral extension to receive a lateral pin on the aforesaid disk, and a fixed pin or abutment for throwing the disk-pin out of the offset of the slot, substantially as shown and described.

6. In a cash-register, the combination with the notched counting-wheels, cog-wheels, adding and carrying wheels, pivoted pendent pawls for locking the cog-wheels, pivoted disks for locking the pawls, a vertically-slidable trip-rod for locking said disks, a slidable cash-drawer that supports the trip-rod in normal position, and means for locking the drawer and releasing and pushing it out, substantially as shown and described.

7. In a cash-register, the combination with the notched counting-wheels, cog-wheels, adding and carrying wheels, pivoted pendent pawls for locking the cog-wheels, pivoted disks for locking the pawls, a vertically-slidable trip-rod for locking said disks, a slidable cash-drawer that supports the trip-rod in normal position, a pivoted catch engaging the drawer, a lever that supports the trip-rod, an air-check cylinder and valve for regulating the movement of such lever, and thereby the operation of the pawl-locking mechanism, substantially as shown and described.

8. In a cash-register, the combination with notched counting-wheels, cog-wheels, adding and carrying wheels, mechanism for locking the adding and other connected wheels, a trip-rod for locking and releasing such mechanism, a pivoted horizontal lever for raising the trip-rod, an air-check for regulating the action of the wheel-locking mechanism, a rotatable disk, a slotted link connecting the latter with the trip-rod lever, and a depressible finger-lever and slotted link pivoted thereto, for rotating such disk, and means for locking and manually releasing the trip-rod lever, as shown and described.

9. In a cash-register, the combination of notched counting-wheels, cog-wheels engaging them, adding-wheels, carrying-wheels, indicating-wheels, springs for reversing the latter, a pivoted frame in which the indicating-wheels are mounted, mechanism for locking the cog and other connected wheels, a trip-rod for releasing and relocking such mechanism, a pivoted horizontal lever for raising the trip-rod, an air cylinder and valve for governing the movement of such lever, a cash-drawer and springs for ejecting it, a catch for locking it, a depressible lever, a slotted link pivoted to the free end of the latter, a rotatable disk and a slotted link connecting the disk with the aforesaid horizontal lever, and a locking-pawl and manual trip-lever for tilting such pawl, as shown and described.

JOHN F. PARKER.

Witnesses:
A. E. DWELLE,
FREDERICK C. CHAMPLIN.